(12) United States Patent
Tsuchimochi et al.

(10) Patent No.: US 9,550,634 B2
(45) Date of Patent: Jan. 24, 2017

(54) PART FEEDER AND PART SUPPLY METHOD

(75) Inventors: Keiji Tsuchimochi, Mie (JP); Koichiro Goto, Mie (JP); Junichi Shirakawa, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 17 days.

(21) Appl. No.: 14/353,539

(22) PCT Filed: Jul. 27, 2012

(86) PCT No.: PCT/JP2012/069088
§ 371 (c)(1),
(2), (4) Date: Apr. 23, 2014

(87) PCT Pub. No.: WO2013/073235
PCT Pub. Date: May 23, 2013

(65) Prior Publication Data
US 2014/0294518 A1    Oct. 2, 2014

(30) Foreign Application Priority Data

Nov. 16, 2011 (JP) .................... 2011-250509

(51) Int. Cl.
*B65G 51/28* (2006.01)
*B26D 3/00* (2006.01)
(Continued)

(52) U.S. Cl.
CPC ............ *B65G 51/28* (2013.01); *B23P 19/005* (2013.01); *B26D 3/003* (2013.01); *B26D 7/0683* (2013.01); *B26D 3/16* (2013.01)

(58) Field of Classification Search
CPC ................. B65G 51/02; B65G 51/28
(Continued)

(56) References Cited

U.S. PATENT DOCUMENTS 3,339,799 A * 9/1967 Spisak ................... 221/176
3,540,622 A * 11/1970 Spisak ................... 221/233
(Continued)

FOREIGN PATENT DOCUMENTS

JP          53-55181         5/1978
JP          57-49829         3/1982
(Continued)

OTHER PUBLICATIONS

International Search Report, mail date is Aug. 28, 2012.

*Primary Examiner* — William R Harp
(74) *Attorney, Agent, or Firm* — Greenblum & Bernstein, P.L.C.

(57) ABSTRACT

The present invention relates to a part feeder supplying a plurality of parts, the part feeder including part supply members having a part loading path enabling the plurality of parts to be loaded in a state where postures of the plurality of parts are lined up. A part passage is provided to a first end of the part loading path, the part passage enabling the plurality of parts to pass while maintaining a fixed posture for each, and in which a gas passage is provided to a second end of the part loading path, the gas passage not enabling the plurality of parts to pass and enabling in- and outflow of a gas. The present invention, accordingly, enables reduction of equipment costs of a part feeder. The present invention is particularly advantageous for a device supplying rubber stoppers.

10 Claims, 7 Drawing Sheets

(51) Int. Cl.
  *B23P 19/00* (2006.01)
  *B26D 7/06* (2006.01)
  *B26D 3/16* (2006.01)
(58) Field of Classification Search
  USPC .................................................. 406/115, 147
  See application file for complete search history.

(56) References Cited

U.S. PATENT DOCUMENTS

| | | | | |
|---|---|---|---|---|
| 4,208,153 | A * | 6/1980 | Trethewy | 406/74 |
| 4,620,656 | A * | 11/1986 | McClay et al. | 227/5 |
| 5,011,339 | A * | 4/1991 | Aurtoi et al. | 406/191 |
| 5,193,717 | A * | 3/1993 | Rink et al. | 221/233 |
| 5,624,054 | A * | 4/1997 | Buns | 221/6 |
| 6,669,435 | B2 * | 12/2003 | Bertsch et al. | 414/811 |
| 8,950,626 | B2 * | 2/2015 | Auriol et al. | 221/278 |

FOREIGN PATENT DOCUMENTS

| | | |
|---|---|---|
| JP | 10-310246 | 11/1998 |
| JP | 2007-288966 | 11/2007 |

\* cited by examiner

Front ←                    → Back

PART FEEDER AND PART SUPPLY METHOD

FIELD OF THE INVENTION

The present invention relates to technology for supplying a part such as a rubber stopper.

BACKGROUND OF THE INVENTION

Patent Literature 1 discloses a rubber stopper penetrating device inserting an electric wire into a rubber stopper in cutting/crimping equipment.

In the rubber stopper penetrating device, one rubber stopper is force-fed, using air, from a rubber stopper supply tube, through a rubber stopper supply hole and a midway portion of a through-hole, and toward an opening on a first end side of the through-hole, then the rubber stopper is held within a rubber stopper accommodation recess of a rubber stopper holding member. Next, a pin member is displaced forward (toward the first end of the through-hole) and a forefront end of a core pin main body is pressed into an interior hole of the rubber stopper within the rubber stopper accommodation recess. In this state, the electric wire is inserted from the front (electric wire holding member side).

The rubber stopper into which the electric wire is to be inserted is formed in an overall tubular shape. When such a rubber stopper is delivered to the rubber stopper penetrating device, the rubber stopper must be delivered with an aligned posture. Therefore, when delivering the rubber stopper to the rubber stopper penetrating device, a vibrating part feeder is employed that includes a vibration mechanism for lining up the posture of the rubber stopper using vibration.

RELATED ART

Patent Literature

Patent Literature 1: Japanese Patent Laid-open Publication No. 2007-288966

SUMMARY OF THE INVENTION

Problem to Be Solved by the Invention

However, this means that one part feeder is connected to each piece of cutting/crimping equipment. Therefore, when performing rubber stopper penetration on a plurality of rubber stopper penetrating devices, the same number of part feeders are required as rubber stopper penetrating devices. Because vibrating part feeders are expensive, this means equipment cost for the rubber stopper penetrating device may increase.

The present invention reduces equipment cost for a rubber stopper penetrating device.

Means for Solving the Problem

In order to resolve the above circumstance, a part feeder according to a first aspect is a part feeder supplying a plurality of parts, the part feeder including a part supply member having a part loading path enabling the plurality of parts to be loaded in a state where postures of the plurality of parts are lined up. An opening on at least one side of the part loading path is formed to enable the plurality of parts to pass while maintaining a fixed posture for each.

In addition, a part passage is provided to a first end of the part loading path, the part passage enabling the plurality of parts to pass while maintaining a fixed posture for each. The part passage is configured to be selectively connectable to a dispensing device individually separating the plurality of parts supplied by the part supply member, and to a different part feeder supplying the plurality of parts with the postures thereof lined up. A gas in- and outflow portion capable of connecting to an air supply source-side is provided to a second end of the part loading path, the gas in- and outflow not enabling the plurality of parts to pass and enabling in- and outflow of a gas.

A third aspect is the part feeder according to the first or second aspect, in which the part supply member is formed in a shape in which a tubular body is coiled.

A part supply method according to a fourth aspect includes a step (a) where a plurality of parts are loaded into the part loading path of the part feeder according to any one of the first to third aspects in a state where postures of the plurality of parts are lined up; and a step (b) where the plurality of parts loaded into the part loading path of the part feeder are individually separated for supply.

Effect of the Invention

According to the first aspect, using a vibrating part feeder or the like, the postures of the plurality of parts can be lined up and the parts can be fed into the part loading path through the opening on at least one side of the part loading path. In addition, the plurality of parts loaded into the part loading path with aligned postures can be supplied, maintaining a fixed posture for each, to an exterior through the opening on at least one side of the part loading path. Therefore, there can be fewer devices lining up the postures of the plurality of parts, such as the vibrating part feeder, than there are installations of rubber stopper penetrating equipment, and equipment cost for the rubber stopper penetrating equipment can be reduced.

According to the second aspect, the parts can be inhibited from popping out through an air passage when the parts have been loaded from the part passage.

According to the third aspect, a total length of the part supply member increases, and therefore a large number of parts can be loaded. Moreover, the part feeder can be made smaller.

According to the fourth aspect, the plurality of parts are loaded into the part loading path of the part feeder according to any one of the first to third aspects, in a state where the postures of the plurality of parts are lined up. In addition, the plurality of parts loaded into the part loading path of the part feeder are individually separated for supply. Therefore, there can be fewer locations where work to line up the postures of the plurality of parts is performed with respect to a number of locations where work requiring the plurality of parts be supplied is performed. Accordingly, there can be fewer devices lining up the postures of the plurality of parts, such as the vibrating part feeder, than there are installations of rubber stopper penetrating equipment, and equipment cost for the rubber stopper penetrating equipment can be reduced.

MODE FOR CARRYING OUT THE INVENTION

Embodiment

Figure 1:
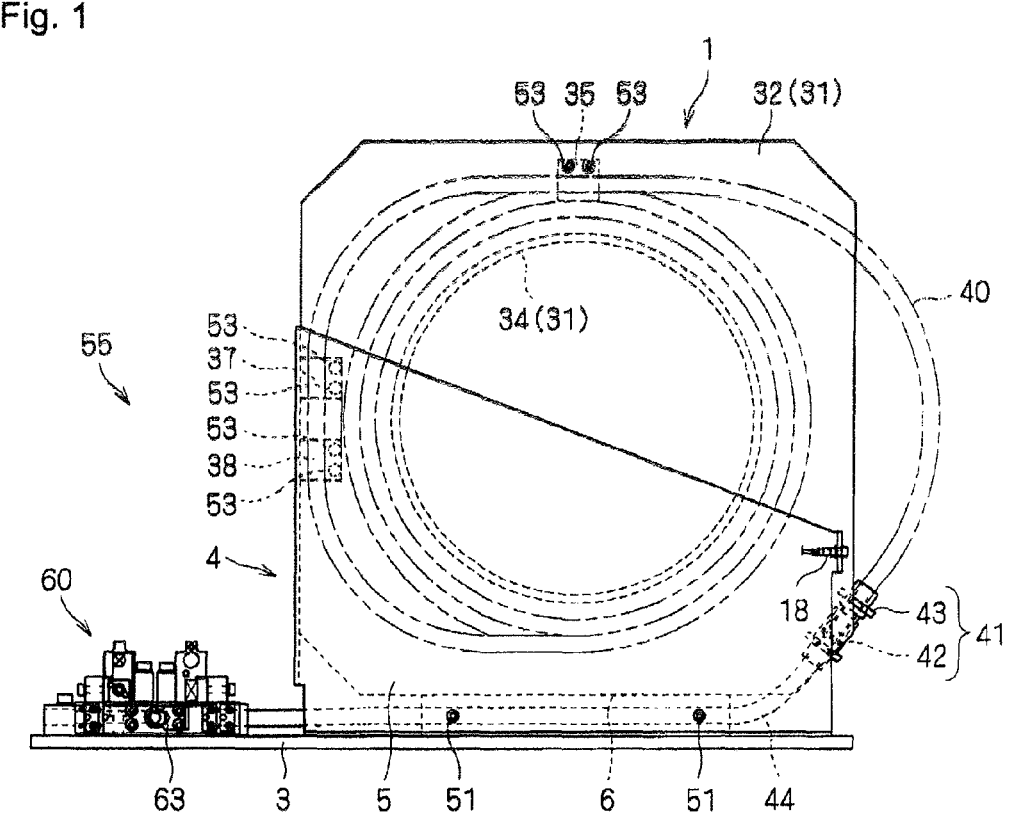
FIG. 1 is a lateral view illustrating a part feeder and a dispensing device according to an embodiment.
Figure 2:
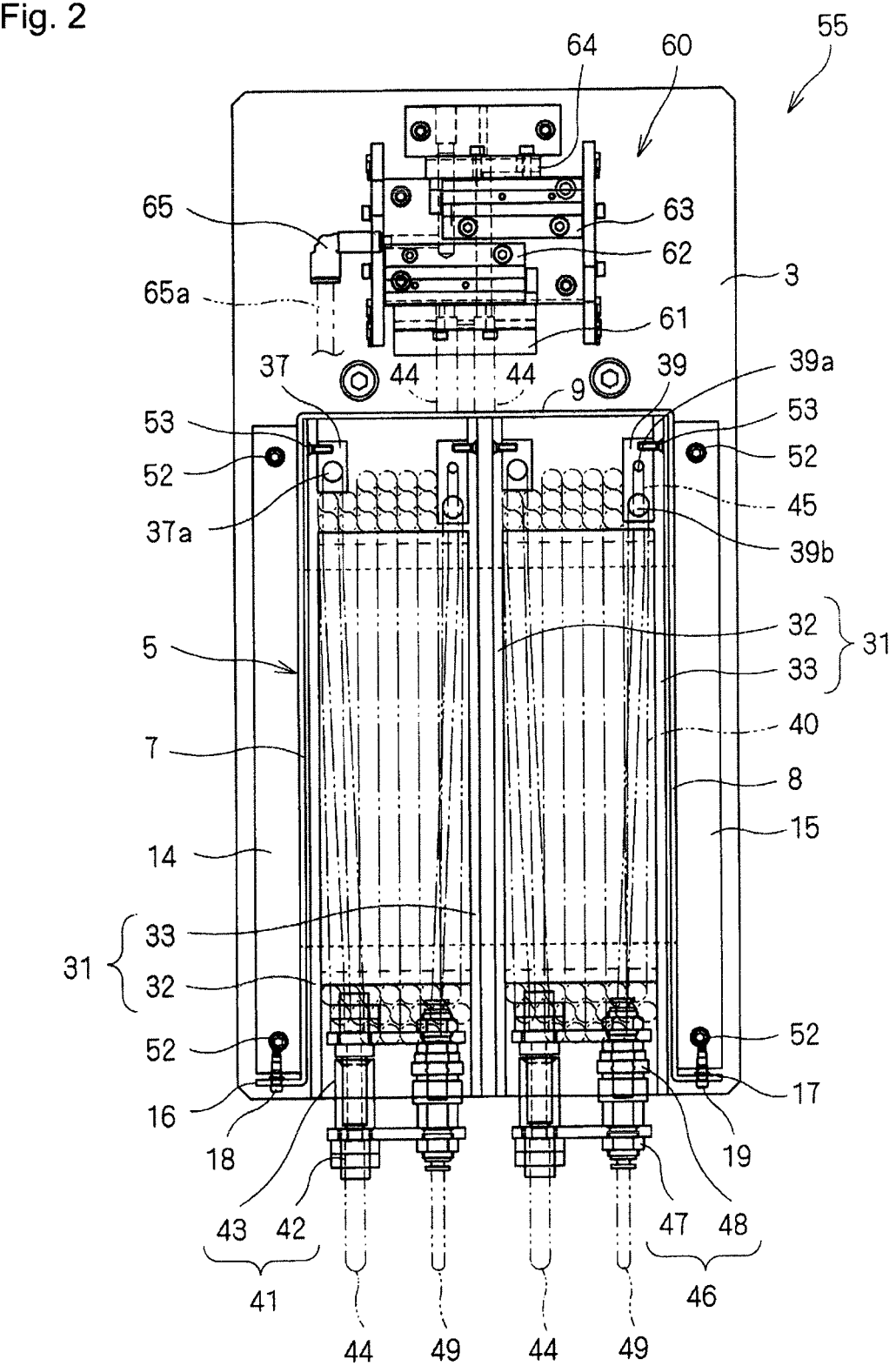
FIG. 2 is a plan view illustrating the part feeder and the dispensing device according to the same.
Figure 3:
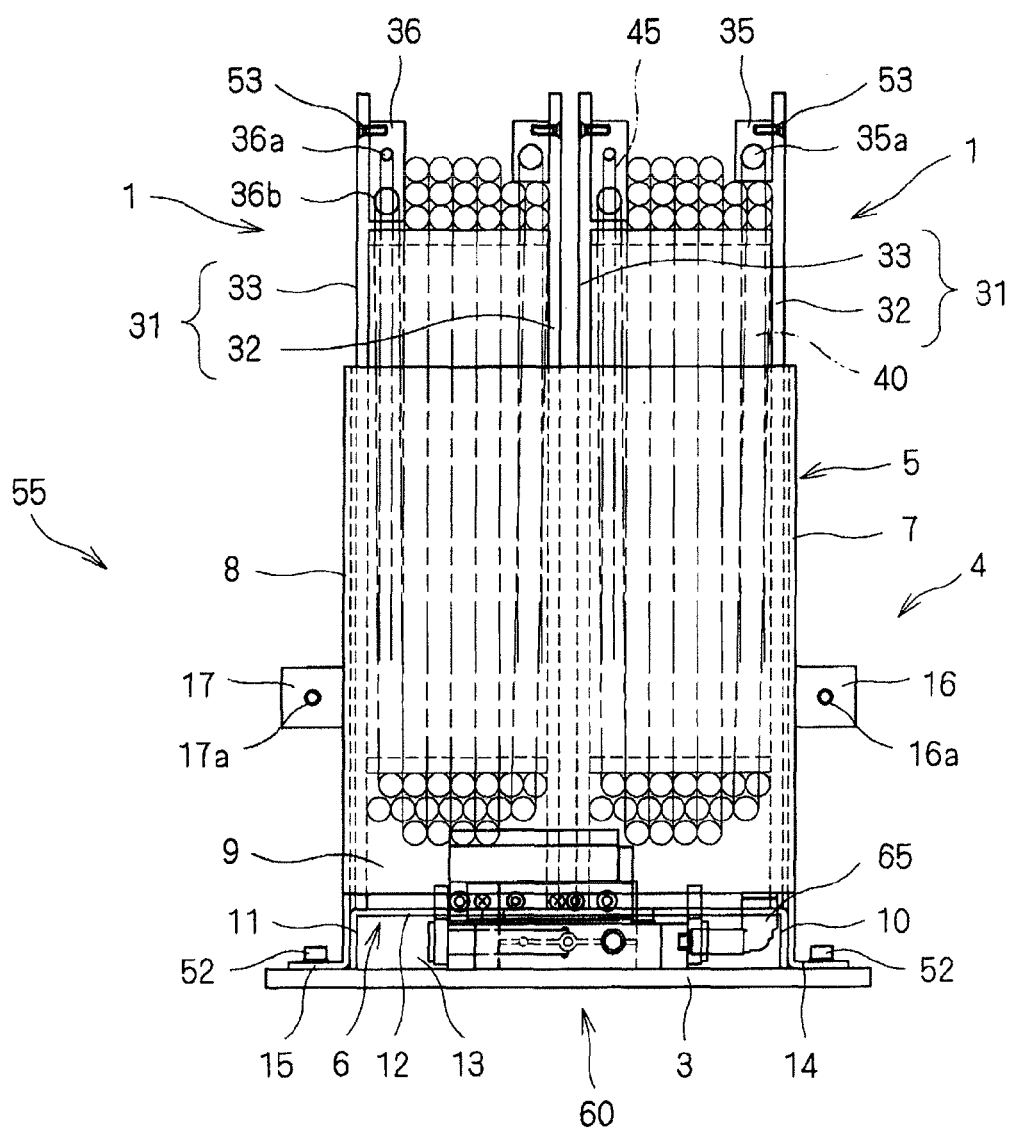
FIG. 3 is a rear view illustrating the part feeder and the dispensing device according to the same.

Hereafter, a part feeder 1 according to an embodiment is described. FIG. 1 is a lateral view illustrating the part feeder 1 and a dispensing device 55. FIG. 2 is a plan view illustrating the part feeder 1 and the clipping device 55. FIG. 3 is a rear view illustrating the part feeder 1 and the dispensing device 55. Moreover, FIG. 2 illustrates a state in which slack in a tube member 40 in FIG. 1 has been eliminated to modify an inclination of two coupler members 41 and 46, and in which upper guide members 35 and 36 have been removed.

The part feeder 1 is portable and supplies parts to the dispensing device 55, maintaining a fixed posture for each part, by connecting to the dispensing device 55 after connecting to a vibrating part feeder without itself including a vibration mechanism to load a plurality of aligned parts such as rubber stoppers having identical shape and size into an interior of the tube member 40 of the part feeder 1 in a state where the postures of the parts are lined up. The rubber stoppers supplied to the dispensing device 55 are individually separated by the dispensing device 55 and delivered to a cut/crimp device (omitted from the drawings). Thereafter, the cut/crimp device cuts and performs terminal crimping on electric wires (omitted from the drawings), then the rubber stopper is penetrated by the wires using a wire insertion device (omitted from the drawings).

Figure 4:
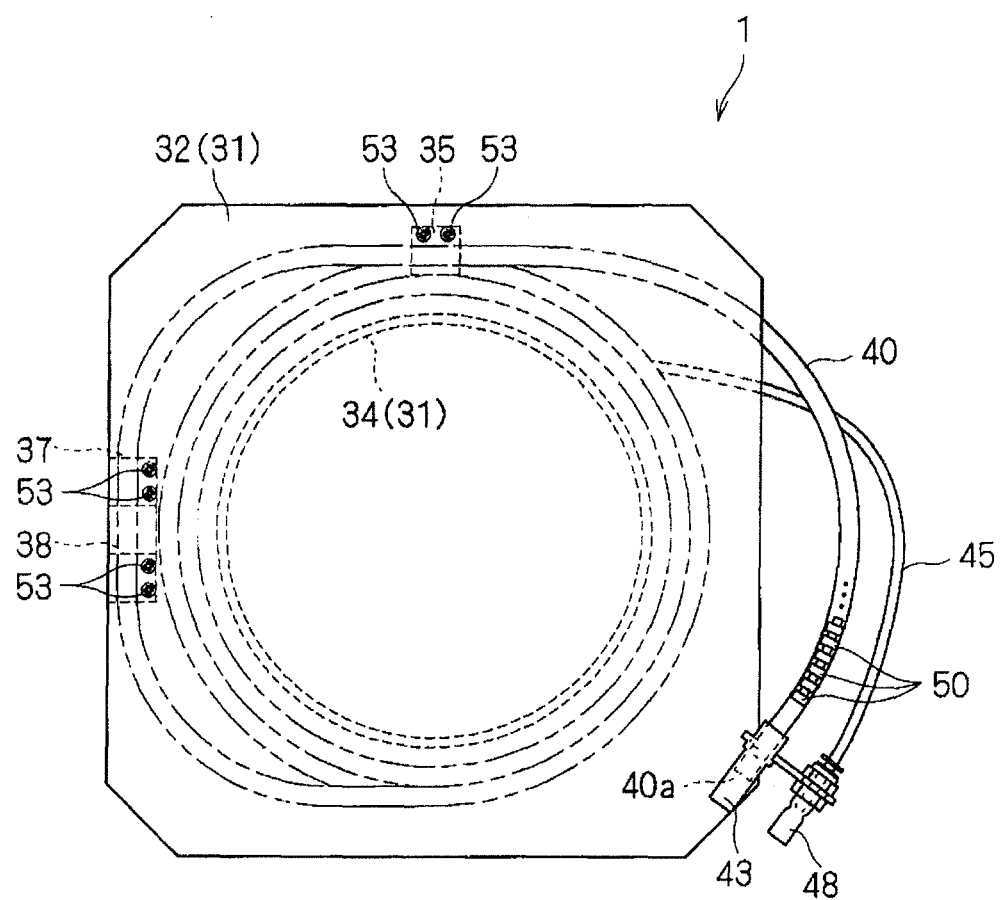
FIG. 4 is a lateral view illustrating the part feeder according to the same.

Next, the part feeder 1 is described. FIG. 4 is a lateral view illustrating the part feeder 1. Herein, two part feeders 1 have the same configuration, and thus only one of the part feeders 1 is described.

The part feeder 1 includes a transparent tube member 40 (tubular body); a male coupler member 43 (part passage) connected to a first end of the tube member 40; an air hose 45 (tubular body) connected to a second end of the tube member 40 via a coupler member (gas passage) omitted from the drawings; a male coupler member 48 connected to a second end of the air hose 45; and a cartridge 31 in which the tube member 40 and the air hose 45 are coiled and held. Moreover, an interior pathway formed by the tube member 40 corresponds to a part loading path enabling the plurality of rubber stoppers 50 to be loaded in a state where the postures of the rubber stoppers 50 are lined up, while the tube member 40, the air hose 45, the male coupler member 43, and the male coupler member 48 correspond to part supply members.

The cartridge 31 includes a pair of plate members 32 and 33 formed in a rectangular shape, and a winding shaft 34 for coiling the tube member 40 and the air hose 45. The pair of plate members 32 and 33 are positioned in parallel so as to be opposite each other, and the winding shaft 34 is anchored between the pair of plate members 32 and 33 at a central portion on the pair of plate members 32 and 33.

The guide member 35 is attached and fixated on an interior surface side of a front-back direction center on a top end portion of the left (left in FIG. 2) plate member 32, the guide member 35 allowing the tube member 40 to be inserted through an insertion hole 35a and guiding the tube member 40 in a winding direction. Two guide members 37 and a guide member 38 are attached and fixated in a vertical direction relative to each other on the interior surface side of a back end portion (dispensing member 60 side, in FIG. 1) at a vertical direction center of the plate member 32, the guide members 37 and 38 allowing the tube member 40 to be inserted through an insertion hole 37a and guiding the tube member 40 in the winding direction.

A guide member 36 is attached and fixated on the interior surface side of the front-back direction center on the top end portion of the right (right in FIG. 2) plate member 33, the guide member 36 allowing the air hose 45 and the tube member 40 to be inserted through an insertion hole 36a and an insertion hole 36b and guiding the air hose 45 and the tube member 40 in the winding direction. Two guide members 39 are attached and fixated in the vertical direction relative to each other on the interior surface side of the back end portion at the vertical direction center of the plate member 33, the guide members 39 allowing the air hose 45 and the tube member 40 to be inserted through an insertion hole 39a and an insertion hole 39b and guiding the air hose 45 and the tube member 40 in the winding direction. As a configuration attaching and fixating the guide members 35 to 39, a configuration employing a screw 53, for example, can be employed.

Next, the tube member 40 and the air hose 45 are described. The tube member 40 and the air hose 45 are formed in a state wrapped around the winding shaft 34. The tube member 40 is formed so as to have an inner diameter corresponding to an outer diameter of the rubber stopper 50. Specifically, the tube member 40 is formed so as to have an inner diameter larger than the outer diameter of the rubber stopper 50 and smaller than a lateral projection geometry of the rubber stopper 50 so as to enable the plurality of rubber stoppers 50 to be loaded and maintain a fixed posture. In addition, the male coupler member 43 of the coupler member 41 is connected to the first end of the tube member 40, and the inner diameter of the male coupler member 43 is formed so as to have an inner diameter larger than the outer diameter of the rubber stopper 50 and smaller than the lateral projection geometry of the rubber stopper 50 so as to enable the plurality of rubber stoppers 50 to be loaded and maintain a fixed posture. Therefore, the tube member 40 (including an opening 40a on the first end) and the male coupler member 43 enable passage of the plurality of rubber stoppers 50, maintaining a fixed posture for each. Moreover, the opening 40a on the first end of the tube member 40 corresponds to an opening on one side of the part loading path.

The tube member 40 is flexible and is formed to a predetermined length. In the present embodiment, the tube member 40 is formed to a length capable of, for example, loading approximately one thousand rubber stoppers 50. However, the tube member 40 can employ members of various lengths according to a number of rubber stoppers 50 to be loaded, and the tube member 40 is not necessarily coiled; instead, when the length of the tube member 40 is short, the tube member 40 may be held in substantially a straight line shape. Additionally, the part supply member may be configured by typical piping or the like, in which case the part supply member may be formed in various shapes such as a wound shape, a straight line shape, and the like. Moreover, envisioned examples of the part to be supplied by the part feeder 1 are, typically, a plurality of kinds of rubber stopper. The plurality of kinds of rubber stopper vary in length, outer diameter, exterior shape, and the like. In this case, various tube members having an inner diameter corresponding to the length, outer diameter, exterior shape, and the like of the rubber stopper can be employed. Aside from a rubber stopper, the part may be other electrical components (terminals or the like), or various components or members intended for automobiles, medicine, food, or the like.

A first end of the air hose 45, which has an inner diameter smaller than the outer diameter of the rubber stopper 50, is connected to the second end of the tube member 40 via a coupler member. The air hose 45 is flexible, the male coupler member 48 of the coupler member 46 is connected to the second end of the air hose 45, and the inner diameters of the male coupler member 48 and the coupler member connected to the second end of the tube member 40 are formed to be smaller than the outer diameter of the rubber stopper 50. Therefore, the coupler member connected to the second end of the tube member 40, the air hose 45, and the male coupler member 48 enable in- and outflow of force-fed air (gas), but do not enable passage of the plurality of rubber stoppers 50.

Figure 8:
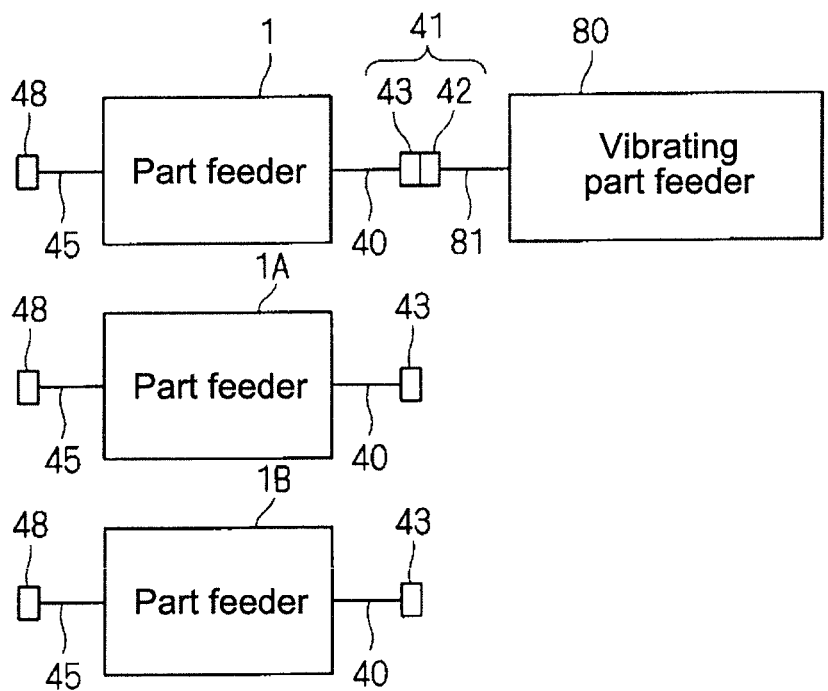
FIG. 8 is an explanatory view illustrating a state of connection during part loading according to the same.

As shown in FIG. 8, in the part feeder 1, a vibrating part feeder 80 is employed which supplies the plurality of rubber stoppers 50 with the postures thereof lined up by vibration, and the rubber stoppers 50 are loaded into the tube member 40 ahead of time. Specifically, the tube member 40 and a supply route 81 of the vibrating part feeder 80 are connected via the coupler member 41. In addition, the male coupler member 48 connected to the air hose 45 is set to an open state and the plurality of rubber stoppers 50 supplied from the vibrating part feeder 80 through the supply route 81 are loaded into the tube member 40 through the male coupler member 43 in a state where the postures of the rubber stoppers 50 are lined up. Details are described hereafter.

Figure 9:
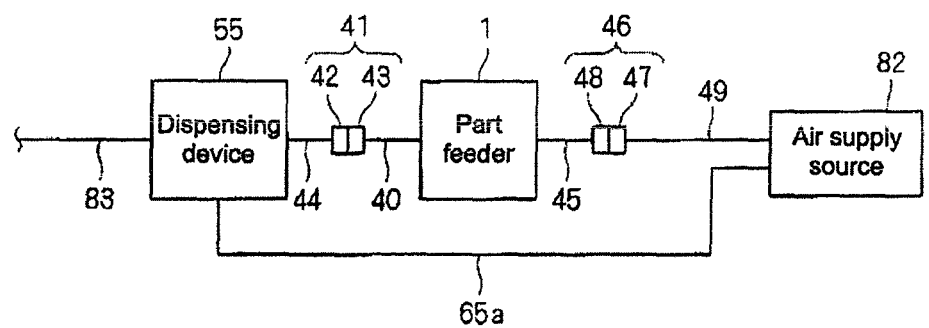
FIG. 9 is an explanatory view illustrating a state of connection during part supply according to the same.

As shown in FIG. 9, when delivering the rubber stoppers 50 to the cut/crimp device, the air hose 45 and an air supply source 82 are connected via the coupler member 46. In addition, the tube member 40 and a tube member 44 of the dispensing device 55 are connected via the coupler member 41. The force-fed air supplied from the air supply source 82 flows in from the male coupler member 48, through the air hose 45, and toward the tube member 40. In addition, the plurality of rubber stoppers 50 force-fed by the force-fed air line up, the force-fed air flows through the tube member 40 and out from the male coupler member 43 in a state where the postures of the plurality of rubber stoppers 50 line up. Details are described hereafter. Moreover, the first and second ends of the tube member 40 (as the part loading path) may enable passage of the plurality of rubber stoppers 50, maintaining a fixed posture for each, without connecting the air hose 45 to the second end of the tube member 40. In addition, a method other than force-fed air may, for example, position the first end of the tube member 40 lower than the supply route 81 and load the plurality of rubber stoppers 50 through the first end of the tube member 40 using gravity and, in addition, may position the second end of the tube member 40 lower than the first end to conduct the plurality of rubber stoppers 50 out through the second end of the tube member 40.

Figure 5:
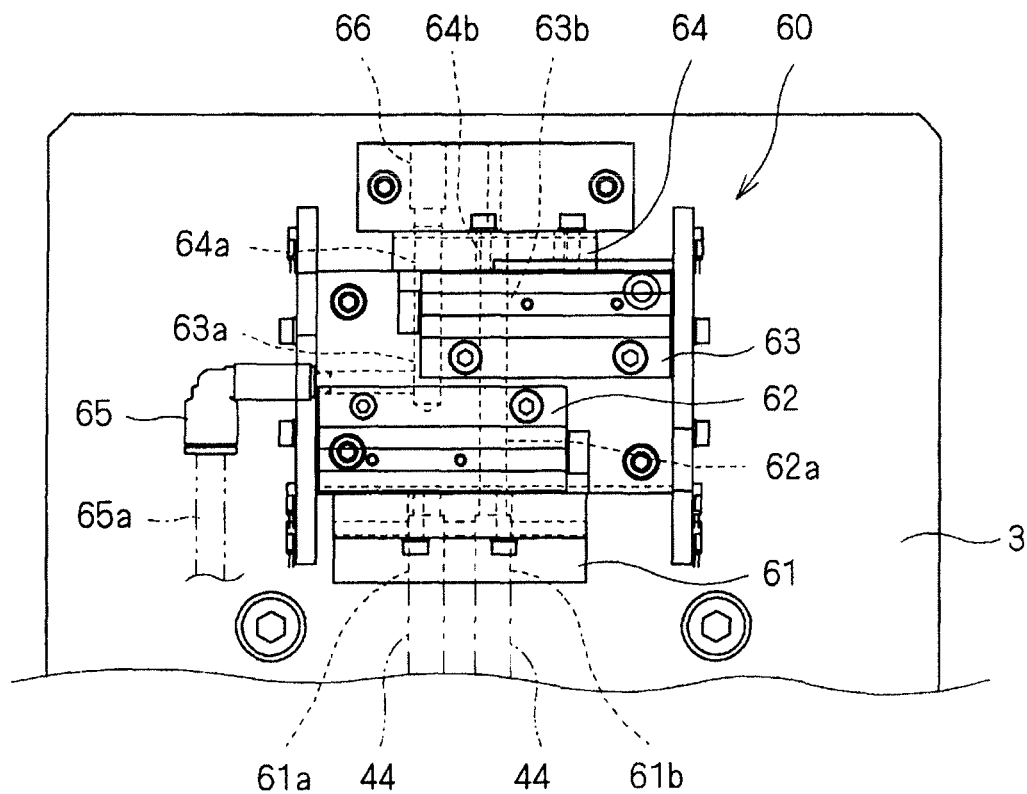
FIG. 5 is an expanded plan view of a base plate on which a dispensing mechanism according to the same is positioned.
Figure 6:
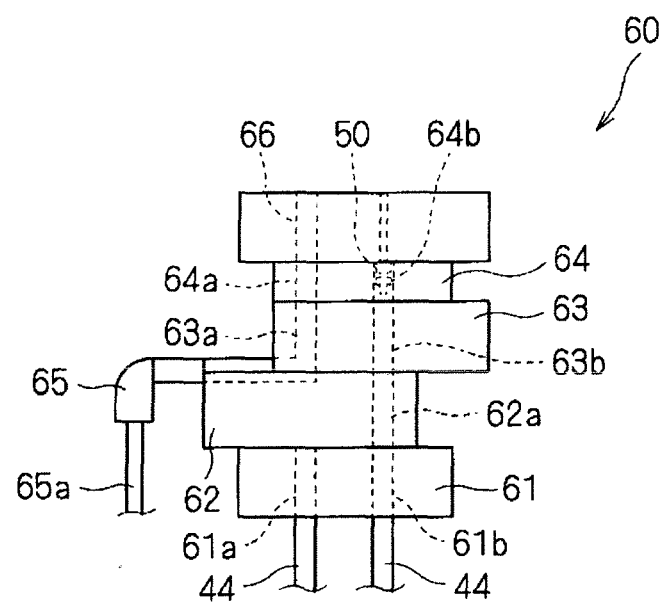
FIG. 6 is an explanatory view illustrating an operation of the dispensing mechanism according to the same.
Figure 7:
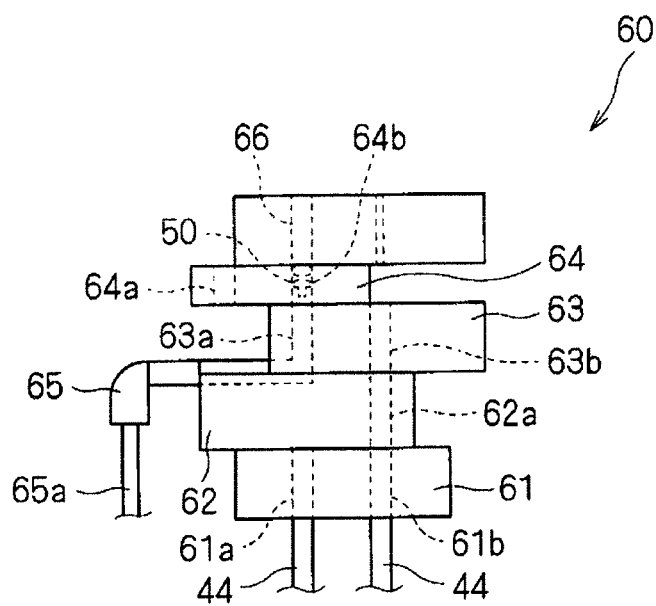
FIG. 7 is an explanatory view illustrating an operation of the dispensing mechanism according to the same.

Next, the dispensing device 55 is described. FIG. 5 is an expanded plan view of a base plate 3 on which a dispensing mechanism 60 is positioned, while FIGS. 6 and 7 are explanatory views illustrating operations of the dispensing mechanism 60. The dispensing device 55 is for individually separating rubber stoppers 50 supplied from the part feeder 1 and delivering them to the cut/crimp device. The dispensing device 55 includes the dispensing mechanism 60; a part feeder mount 4 detachably holding the part feeder 1; the tube member 44, a female coupler member 42, an air hose 65a, and the base plate 3.

The part feeder mount 4 is positioned toward a front side of the base plate 3 (first end side in a length direction of the base plate 3), which is formed in a rectangular shape in a plan view, and is configured such that two part feeders 1 can be mounted in a parallel state in a width direction of the part feeder mount 4 with a gap therebetween. The part feeder mount 4 includes a main body member 5 and a stage 6 on which the part feeders 1 are placed. The main body member 5 is provided so as to be upright on the front side of the base plate 3 (first end side in the length direction of the base plate 3), and opens upward and forward (first end side in the length direction of the base plate 3). The main body member 5 includes mutually parallel side panels 7 and 8 extending in the length direction of the base plate 3, and a back panel 9 parallel to the width direction of the base plate 3. The side panels 7 and 8 have a shape that inclines lower further forward. In a state where the part feeders 1 are mounted on the part feeder mount 4, an upper portion and a front end portion of the part feeders 1 each project past the main body member 5. Moreover, the part feeders 1 mounted on the part feeder mount 4 are not limited to two: the part feeder mount 4 may be formed so as to enable only one part feeder 1 to be mounted, or so as to enable one or three or more part feeders 1 to be mounted.

Outward-flaring attachment portions 14 and 15 are formed on bottom ends of the side panels 7 and 8, and the main body member 5 is attached and fixated to the base plate 3 via the attachment portions 14 and 15. As a configuration attaching and fixating the main body member 5, a configuration employing a bolt 52, for example, can be employed.

The bottom end of the back ends on the side panels 7 and 8 are formed so as to be above the top surface of the base plate 3 and above the stage 6. Outward-projecting flared portions 16 and 17 are formed on top ends of front ends of the side panels 7 and 8, respectively, and lamps 18 and 19 are inserted through and fixated to holes 16a and 17a, respectively, formed on the flared portions 16 and 17. The lamps 18 and 19 are configured to illuminate the lamp 18 or the lamp 19 provided on the side of the part feeder 1, of the two part feeders 1, that is in operation (feeding out rubber stoppers).

The stage 6 is formed to have a rectangular shape in plan view, and includes mutually parallel side panels 10 and 11 extending in the front-back direction (length direction of the base plate 3) and a top panel 12. The stage 6 is positioned at a front-back direction center of the main body member 5, and is attached and fixated in a state where the outer surfaces of the side panels 10 and 11 on the stage 6 internally contact the inner surfaces of lower ends of the side panels 10 and 11 on the main body member 5. As a configuration attaching and fixating the stage 6, a configuration employing a screw 51, for example, can be employed.

The top surface of the top panel 12 is formed on the horizontal plane, and is configured to enable the part feeder 1 to be stably placed thereon. A space 13 into which an air hose 49 and a tube member 44 are passed is formed between the top surfaces of the top panel 12 and the base plate 3, the air hose 49 supplying force-fed air through the air hose 45 to the tube member 40, and the tube member 44 supplying the rubber stoppers 50 loaded into the tube member 40 to the dispensing mechanism 60. In this way, the tube member 44 passes through the space 13 between the top panel 12 and the base plate 3 and is connected to the dispensing mechanism 60. In addition, the air hose 49 passes through the space 13 between the top panel 12 and the base plate 3 and is connected to the air supply source 82 (see FIG. 9).

The dispensing mechanism 60 is positioned on a front side of the base plate 3 (second end in the length direction of the base plate 3), and includes a switching member 61 and the dispensing member 64, drive mechanisms 62 and 63, and an air supplier 65. The air supplier 65 is connected to the air supply source 82 (see FIG. 9) via an air hose 65a, while a delivery pathway 66 is connected to a delivery route 83 (see FIG. 9) of the cut/crimp device. The force-fed air is constantly supplied from the air supply source 82, and therefore, in the case of FIG. 6, the force-fed air supplied by the air supplier 65 flows through an air pathway 63a, a pathway 64a, and the delivery pathway 66 to the delivery route 83 of the cut/crimp device.

The drive mechanism 62 drives the switching member 61, and the switching member 61 is driven by the drive mechanism 62 to displace from a first position, where the pathway 61b communicates with a pathway 62a, to a second position, where a pathway 61a communicates with the pathway 62a. The drive mechanism 63 drives the dispensing member 64, and the dispensing member 64 is driven by the drive mechanism 63 to displace from a retention position shown in FIG. 6 to the dispensing position shown in FIG. 7. Moreover, the drive mechanisms 62 and 63 are configured by drive mechanisms that include a known actuator, such as an air cylinder or a linear motor.

Next, operations of the dispensing mechanism 60 are described. When the rubber stopper 50 is supplied from the left part feeder 1, the switching member 61 is in the first position, as illustrated in FIG. 6. Therefore, the pathway 61a of the switching member 61 does not communicate with the pathway 62a. Accordingly, the rubber stopper 50 passes through the left tube member 44 and is held in the pathway 61a of the switching member 61. When the switching member 61 is driven by the drive mechanism 62 to displace to the second position, the pathway 61a communicates with the pathway 62a, and thus the rubber stopper 50 passes through the pathway 62a and a pathway 63b to be held in an accommodation hole 64b of the dispensing member 64. Also, as shown in FIG. 7, when the dispensing member 64 is driven by the drive mechanism 63 to displace to the dispensing position, one rubber stopper 50 is separated. At that point, the accommodation hole 64b communicates with the air pathway 63a and the delivery pathway 66, and therefore the rubber stopper 50 passes through the delivery pathway 66 due to force-fed air supplied by an air supplier 65 and is delivered to the delivery route 83 of the cut/crimp device.

Meanwhile, in a case where the rubber stopper 50 is supplied from the right part feeder 1, when the switching member 61 is in the first position, as illustrated in FIG. 6, the rubber stopper 50 passes through the pathway 61b of the switching member 61, the pathway 62a of the drive mechanism 62, and the pathway 63b of the drive mechanism 63 to be held in the accommodation hole 64b of the dispensing member 64. Also, as shown in FIG. 7, when the dispensing member 64 is driven by the drive mechanism 63 to displace to the dispensing position, one rubber stopper 50 is separated. At that point, the accommodation hole 64b communicates with the air pathway 63a and the delivery pathway 66, and therefore the rubber stopper 50 passes through the delivery pathway 66 due to force-fed air supplied by the air supplier 65 and is delivered to the delivery route 83 of the cut/crimp device.

According to the part feeder 1 configured as noted above, using the vibrating part feeder 80 or the like, the postures of the plurality of rubber stoppers 50 can be lined up and the rubber stoppers 50 can be fed into the part loading path through the opening 40a on at least one side of an interior pathway of the tube member 40 (as the part loading path). In addition, the plurality of rubber stoppers 50 loaded into the part loading path with aligned postures can be supplied, maintaining a fixed posture for each, to an exterior through the opening 40a on at least one side of the part loading path. Therefore, there can be fewer devices lining up the postures of the plurality of rubber stoppers 50, such as the vibrating part feeder 80, than there are installations of rubber stopper penetrating equipment, and equipment cost for the rubber stopper penetrating equipment can be reduced.

The male coupler member 43 is provided to a first end of the part loading path, the male coupler member 43 enabling the plurality of rubber stoppers 50 to pass while maintaining a fixed posture for each, while the coupler member is provided to a second end of the part loading path, the coupler member not enabling the plurality of rubber stoppers 50 to pass and enabling in- and outflow of force-fed air. Therefore, when the rubber stoppers 50 are loaded from the male coupler member 43, the rubber stoppers 50 can be inhibited from popping out through the coupler member.

The tube member 40, air hose 45, male coupler member 43, and male coupler member 48 (as the part supply members) are formed into shapes in which the tube member 40 and the air hose 45 are coiled. Therefore, the total length of the part supply members can be increased and a large number of rubber stoppers 50 can be loaded. Moreover, the part feeder 1 can be made smaller.

<Part Supply Method>

Next, a part supply method using the part feeder 1 is described. The part supply method includes a step (a) where the plurality of rubber stoppers 50 are loaded into the part loading path of the part feeder 1 in a state where the postures of the plurality of stoppers are lined up; and a step (b) where the plurality of rubber stoppers 50 loaded into the part loading path of the part feeder 1 are individually separated for supply.

First, a worker mounts one or two part feeders 1 with no rubber stoppers 50 loaded therein onto the rubber stopper loading part feeder mount 4 having no dispensing mechanism 60 positioned thereon. Specifically, the part feeder 1 is placed on the stage 6 in a state where the back end of the part feeder 1 is tightly attached to the front surface of the back panel 9 of the main body member 5. After mounting the part feeder 1, as shown in FIG. 8, the first end of the tube member 40 of the part feeder 1 and the supply route 81 of the vibrating part feeder 80 are connected via the coupler member 41. In addition, the male coupler member 48 connected to the second end of the air hose 45 is left in an open state. Then, the plurality of rubber stoppers 50 flowing in with the force-fed air from the vibrating part feeder 80 and through the male coupler member 43 are loaded into the interior of the tube member 40 in a state where the postures of the plurality of rubber stoppers 50 are lined up. At this point, the force-fed air flows out from the male coupler member 48 connected to the air hose 45, but the rubber stoppers 50 do not pop out.

When loading of the rubber stoppers 50 is complete, the connection between the first end of the tube member 40 and the supply route 81 of the vibrating part feeder 80 is released and the part feeder 1 is removed from the part feeder mount 4. Moreover, in a case where rubber stoppers 50 having identical diameters are loaded, the first end of the tube member 40 of the part feeder 1 having the same tube member 40 and the supply route 81 of the vibrating part feeder 80 are connected via the coupler member 41, and work similar to the above is performed. In a case where different types of rubber stoppers are loaded, the first end of a tube member of different part feeders 1A or 1B having a tube member with an inner diameter corresponding to the rubber stoppers and a supply route of a vibrating part feeder corresponding to the rubber stoppers to be loaded are connected via a coupler member, and work similar to the above is performed.

Next, when the rubber stoppers 50 are supplied from the part feeder 1 to the dispensing device 55, the worker mounts the one or two part feeders 1 with the rubber stoppers 50 loaded therein onto the part feeder mount 4 of the dispensing device 55. Specifically, the part feeder 1 is placed on the stage 6 in a state where the back end of the part feeder 1 is tightly attached to the front surface of the back panel 9 of the main body member 5. After mounting the part feeder 1, as shown in FIG. 9, the female coupler member 47 of the air hose 49 connected to the air supply source 82 is connected to the male coupler member 48 of the air hose 45. In addition, the female coupler member 42 of the tube member 44 is connected to the male coupler member 43 of the tube member 40.

Next, when force-fed air flows from the air supply source 82, through the air hoses 49 and 45, and into the second end of the tube member 40, the plurality of rubber stoppers 50 loaded into the interior of the tube member 40 are displaced through the interior of the tube member 40 by the force-fed air; are successively fed out, while maintaining a fixed posture for each, from the male coupler member 43 connected to the first end of the tube member 40; and pass through the tube member 44 to be supplied to the dispensing mechanism 60. The successively supplied rubber stoppers 50 are individually separated by the dispensing mechanism 60 and are delivered to the cut/crimp device. When, after all of the rubber stoppers loaded into the tube member 40 of the first part feeder 1 have been fed out, the rubber stoppers 50 loaded into the tube member 40 of the second part feeder 1 are supplied to the dispensing device 55, the operation can be performed with a method similar to the above.

According to the part supply method using the part feeder 1 described above, the plurality of rubber stoppers 50 are loaded into the part loading path in a state where the postures of the plurality of rubber stoppers 50 are lined up. In addition, the plurality of rubber stoppers 50 loaded into the tube member 40 of the part feeder 1 are individually separated for supply. Thus, using the vibrating part feeder 80 or the like, the postures of the plurality of rubber stoppers 50 can be lined up and the rubber stoppers 50 can be fed into the part loading path through the opening 40a on at least one side of the interior pathway of the tube member 40 (as the part loading path). In addition, the plurality of rubber stoppers 50 loaded into the part loading path with aligned postures can be supplied, maintaining a fixed posture for each, to the exterior through the opening 40a on at least one side of the part loading path. Therefore, there can be fewer locations where work to line up the postures of the plurality of rubber stoppers 50 is performed with respect to a number of locations where work requiring the plurality of rubber stoppers 50 be supplied is performed. Accordingly, there can be fewer devices lining up the postures of the plurality of rubber stoppers 50, such as the vibrating part feeder 80, than there are installations of rubber stopper penetrating equipment, and equipment cost for the rubber stopper penetrating equipment can be reduced.

The present invention has been described in detail above; however, the above description is in all respects illustrative and the present invention is not limited to the above description. Innumerable modifications not presented are understood to be conceivable without deviating from the scope of the present invention.

What is claimed is:

1. A part feeder supplying a plurality of parts, the part feeder comprising:
    a part supply member having:
        a continuous tube member enabling the plurality of parts to be loaded inside the tube member in a condition in which postures of the plurality of parts are lined up, the continuous tube member having a first opening at a first end of the tube member configured to enable the plurality of parts to pass while maintaining a fixed posture for each and a second opening at a second end of the tube member;
        a part passage defined by a male coupler provided at the first opening of the tube member, the part passage enabling the plurality of parts to pass while maintaining a fixed posture for each, the male coupler being selectively connectable to:
            a dispensing device individually separating the plurality of parts supplied by the part supply member; and
            a different part feeder supplying the plurality of parts with the postures thereof lined up; and
        a gas in- and outflow portion defined by a second male coupler and configured for connection to the second opening of the tube member, wherein
    when the second opening of the tube member is connected to the gas in- and outflow portion, the plurality of parts are prevented from passing out of the second opening of the tube member and the in- and outflow of a gas is enabled.

2. The part feeder according to claim 1, wherein the part supply member having a shape in which the tube member is coiled.

3. The part feeder according to claim 1, wherein the second male coupler is directly coupled to the second opening of the tube member.

4. A part supply method, comprising:
    loading a plurality of parts into the tube member of the part feeder according to claim 1 in a condition in which postures of the plurality of parts are lined up; and
    individually separating the plurality of parts loaded into the tube member of the part feeder for supply.

5. A part supply method, comprising:
    loading a plurality of parts into the tube member of the part feeder according to claim 2 in a condition in which postures of the plurality of parts are lined up; and
    individually separating the plurality of parts loaded into the tube member of the part feeder for supply.

6. A part feeder supplying a plurality of parts, the part feeder comprising:
    a vibrating part feeder that supplies the plurality of parts with postures thereof lined up;
    a plurality of part supply members, each part supply member having:
        a continuous tube member enabling the plurality of parts to be loaded inside the tube member in a condition in which the postures of the plurality of parts are lined up, the continuous tube member having a first opening at a first end of the tube member configured to enable the plurality of parts to pass while maintaining a fixed posture for each and a second opening at a second end of the tube member;

a part passage defined by a male coupler provided at the first opening of the tube member, the part passage enabling the plurality of parts to pass while maintaining a fixed posture for each, and a gas in- and outflow portion defined by a second male coupler and configured for connection to the second opening of the tube member such that when the second opening of the tube member is connected to the gas in- and outflow portion, the plurality of parts are prevented from passing out of the second opening of the tube member and the in- and outflow of a gas is enabled; and a dispensing device that individually separates the plurality of parts that are supplied by at least one part supply member of the plurality of part supply members, wherein the male coupler of each of the plurality of part supply members being selectively connectable to the dispensing device and the vibrating part feeder.

7. The part feeder according to claim 6, wherein the plurality of part supply members each have a shape in which the tube member is coiled.

8. The part feeder according to claim 6, wherein the second male coupler of each of the plurality of part supply members is directly coupled to the second opening of the respective tube member.

9. A part supply method, comprising:

loading a plurality of parts into the tube member of the at least one of the plurality of part supply members of the part feeder according to claim 6 in a condition in which postures of the plurality of parts are lined up; and individually separating the plurality of parts loaded into the tube member of the at least one of the plurality of part supply members of the part feeder for supply.

10. A part supply method, comprising:

loading a plurality of parts into the tube member of the at least one of the plurality of part supply members of the part feeder according to claim 7 in a condition in which postures of the plurality of parts are lined up; and individually separating the plurality of parts loaded into the tube member of the at least one of the plurality of part supply members of the part feeder for supply.

* * * * *